United States Patent [19]
Lewis et al.

[11] Patent Number: 6,145,038
[45] Date of Patent: Nov. 7, 2000

[54] METHOD AND SYSTEM FOR EARLY SLAVE FORWARDING OF STRICTLY ORDERED BUS OPERATIONS

[75] Inventors: Jerry Don Lewis, Round Rock; John Steven Dodson, Pflugerville; Ravi Kumar Arimilli, Austin, all of Tex.

[73] Assignee: International Business Machines Corporation, Armonk, N.Y.

[21] Appl. No.: 08/833,228

[22] Filed: Oct. 31, 1997

[51] Int. Cl.⁷ .................................................. G06F 13/14
[52] U.S. Cl. ................................................. 710/105
[58] Field of Search .................................. 710/105, 100, 710/33, 22–28, 112; 370/462

[56] References Cited

U.S. PATENT DOCUMENTS

| | | | |
|---|---|---|---|
| 5,067,069 | 11/1991 | Fite et al. | 395/375 |
| 5,109,495 | 4/1992 | Fite et al. | 395/375 |
| 5,125,083 | 6/1992 | Fite et al. | 395/375 |
| 5,179,663 | 1/1993 | Iimura | 710/35 |
| 5,185,871 | 2/1993 | Frey et al. | 395/375 |
| 5,271,020 | 12/1993 | Marisetty | 714/746 |
| 5,317,720 | 5/1994 | Stamm et al. | 395/425 |
| 5,333,296 | 7/1994 | Bouchard et al. | 395/425 |
| 5,371,893 | 12/1994 | Price et al. | 395/725 |
| 5,375,223 | 12/1994 | Meyers et al. | 395/425 |
| 5,388,232 | 2/1995 | Sullivan et al. | 710/105 |
| 5,394,529 | 2/1995 | Brown, III et al. | 395/375 |
| 5,481,689 | 1/1996 | Stamm et al. | 395/412 |
| 5,509,129 | 4/1996 | Guttag et al. | 395/375 |
| 5,513,368 | 4/1996 | Garcia, Jr. et al. | 395/842 |
| 5,542,058 | 7/1996 | Brown, III et al. | 395/375 |
| 5,546,546 | 8/1996 | Bell et al. | 710/112 |
| 5,592,631 | 1/1997 | Kelly et al. | 710/113 |
| 5,630,077 | 5/1997 | Krein et al. | 710/113 |
| 5,717,872 | 2/1998 | Whittaker | 710/105 |
| 5,774,679 | 6/1998 | Kondo et al. | 710/105 |
| 5,835,741 | 11/1998 | Elkhoury et al. | 710/129 |
| 5,937,171 | 8/1999 | Sarangdhar et al. | 340/825.07 |

FOREIGN PATENT DOCUMENTS

| | | | |
|---|---|---|---|
| 0602890A2 | 6/1994 | European Pat. Off. | G06F 15/16 |
| 0684720A2 | 11/1995 | European Pat. Off. | H04L 29/06 |
| WO9418634 | 8/1994 | WIPO | G06F 15/40 |

OTHER PUBLICATIONS

The Zmodem Inter Application File Transfer Protocol, Oct. 27, 1987.

*Primary Examiner*—Paul R. Myers
*Attorney, Agent, or Firm*—Sawyer Law Group LLP; Leslie A. VanLeeuwen

[57] ABSTRACT

A system and method for transferring bus operations in a processing system which includes at least one processor, the method and system include issuing a plurality of ordered bus operations by the at least one processor, wherein the plurality of bus operations include a first bus operation and a second bus operation, wherein the second bus operation is issued next after the first bus operation is issued. It also determines if a first response for the first bus operation has been received by the at least one processor prior to issuing the second bus operation, wherein the first response indicates that the first bus operation can be transferred. If the first response for the first bus operation is received by the at least one processor prior to issuing the second bus operation, a signal is provided along with the second bus operation, wherein the signal indicates that the processor will not issue a second response for the second bus operation, wherein the second response indicates that the second bus operation should be reissued.

8 Claims, 9 Drawing Sheets

METHOD AND SYSTEM FOR EARLY SLAVE FORWARDING OF STRICTLY ORDERED BUS OPERATIONS

FIELD OF THE INVENTION

The present invention relates to transferring information in a processing system, and more particularly to a system and method for quickly transferring bus operations which are preferably strictly ordered.

BACKGROUND OF THE INVENTION

This application is related to U.S. Ser. No. 08/833,227.

Multi-processor systems are now commonly used in environments such as businesses and research. When a processor in a multiprocessor system requests access to the memory, an arbiter is typically utilized to determine which data request is granted and in which order. These requests from the processors and grants from the arbiter are typically carried by the system bus.

Information is typically marked either "cacheable", "cache inhibited", or "writethrough". If information is marked cacheable, then the data can be stored within a cache, rather than having to be transferred to the system memory. If, however, the information is marked cache inhibited, then the data can not go into cache and must be transferred elsewhere, such as system memory. An example of an application which frequently utilizes cache inhibited store instructions is graphics applications. If the information is marked write-through, then the information will go to its destination as well as to the caches. Some of the cache inhibited or write-through information will typically be strictly ordered bus operations.

Computer systems using PowerPC™ processors must insure that strictly ordered bus operations are issued to the receiving device in the exact same order of execution from the processor. Computer systems using Amazon PowerPC™ may require strict ordering for all operations.

Traditional bus interface unit (BIU) design will cue up strictly ordered bus operations, such as cache inhibited stores, request the bus for an address and data transfer, issue the first bus operation when granted the bus, and wait for a response. If the address was accepted (not retried), and the data has already been transferred, then the BIU will request the bus for the next ordered bus operation. The number of cycles that the BIU must wait for a response is typically system dependent. However, the delay between the transferring of ordered bus operations directly translate into less than optimal performance Additionally, a system may attain higher industry standard benchmarks if the system can achieve good throughput of the ordered bus operations.

Accordingly, what is needed is a system and method for high speed transferring of strictly ordered bus operations. The present invention addresses such a need.

SUMMARY OF THE INVENTION

A system and method for high speed transferring of bus operations which are preferably strictly ordered in a processing system is provided. A system and method in accordance with the present invention comprises issuing a plurality of bus operation requests by a processor and determining if a first response has been received by the same processor indicating that one of the plurality of bus operation requests should be reissued. Then, if the first response is received, the processor provides a second response indicating that at least another of the issued bus operation requests should be reissued.

In another aspect of the invention, a system and method for transferring bus operations using a bus in a processing system includes at least one processor which can obtain control of the bus. The system and method according to the present invention includes the steps of issuing a plurality of bus operation requests by the at least one processor; issuing a bus operation; determining if a response has been received by the at least one processor indicating that the issued bus operation should be reissued; and retaining control of the bus by the at least one processor and reissuing the bus operation, if the response has been received which indicates that the bus operation would be reissued.

In yet another aspect of the invention, a system and method for transferring bus operations in a processing system which includes at least one processor, the method and system include issuing a plurality of ordered bus operations by the at least one processor, wherein the plurality of bus operations include a first bus operation and a second bus operation, wherein the second bus operation is issued next after the first bus operation is issued. It also determines if a first response for the first bus operation has been received by the at least one processor prior to issuing the second bus operation, wherein the first response indicates that the first bus operation can be transferred. If the first response for the first bus operation is received by the at least one processor prior to issuing the second bus operation, a signal is provided along with the second bus operation, wherein the signal indicates that the processor will not issue a second response for the second bus operation, wherein the second response indicates that the second bus operation should be reissued.

The system and method according to the present invention significantly improves bus operation performance.

DESCRIPTION OF THE INVENTION

The present invention relates to a system and method for high speed transferring of bus operations, preferably strictly ordered bus operations, in a processing system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

For purposes of illustration, the context of this invention disclosure will reference cache inhibited store operations as an example of strictly ordered bus operations. However, it is to be understood that discussion related to cache inhibited store operations is merely an example of the method and system according to the present invention and the methods and systems described herein applies generally to strictly ordered bus operations.

Figure 1:
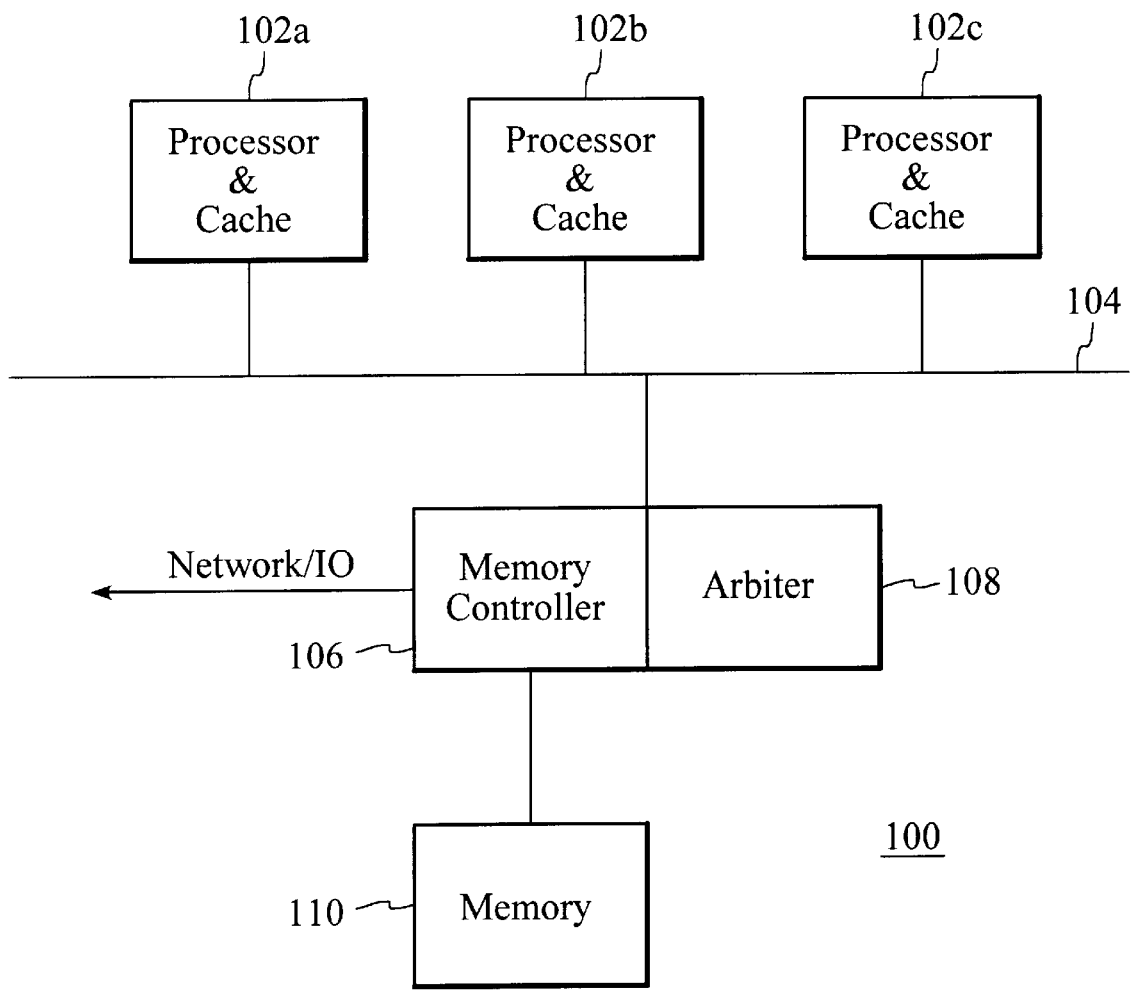
FIG. 1 is a block diagram of a multiprocessor system in which the present invention resides.

FIG. 1 is a block diagram of a multiprocessor system in which the present invention resides. The system 100 includes processors, each including a cache, hereinafter referred to as processors 102a–102c, a system bus 104, a memory controller 106, an arbiter 108, and a memory 110.

A computer system utilizing multiple processors 102a–102c is often configured with multiple bus masters, which may be processors 102a–102c, attached to the memory controller 106 via heavily loaded address bus 104. Each bus master may be a single processor 102a–102c, or a combination of processors 102 and caches that communicate to the memory controller 106 through a bus interface unit, sometimes referred to as the arbiter 108, that must arbitrate for memory resources. The arbiter 108 can be either internal or external to the memory controller 106. The memory controller can be coupled to a network.

Figure 2:
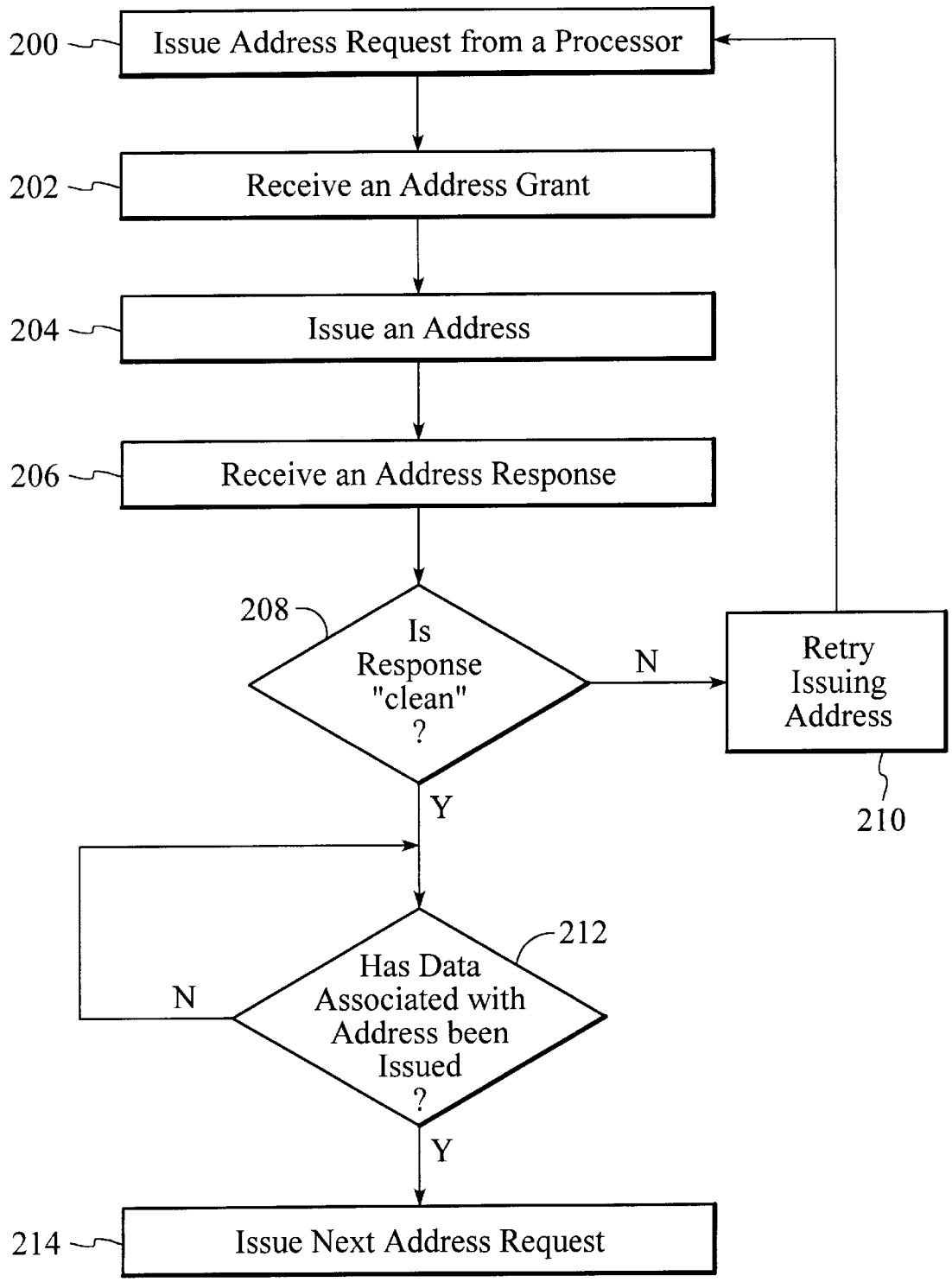
FIG. 2 is a flow diagram of a conventional method for bus operation forwarding.

The system 100, as shown in FIG. 1, may be referred to when reviewing the flow diagram shown in FIG. 2. FIG. 2 is a flow diagram of a conventional method for transferring cache-inhibited store instructions. First, an address request is issued from a processor via step 200. Sometime later, the processor will receive an address grant via step 202. The processor then issues the address via step 204 and waits until an address response is received via step 206. The address response for a cache-inhibited store is typically either "clean" or "retry". A "clean" response indicates that the bus operation can be transferred. A "retry" response indicates that the bus operation should be reissued.

It is then determined if the address response was "clean" via step 208. If the response was not "clean", then the processor retries issuing the address via step 210. If, however, the response was "clean" via step 208, then it is determined if the data associated with the address has been issued via step 212. If the data associated with the address has not yet been issued via step 212, then the system waits until it has. When the data associated with the address is issued, then the next address request can be issued via step 214.

Figure 3:
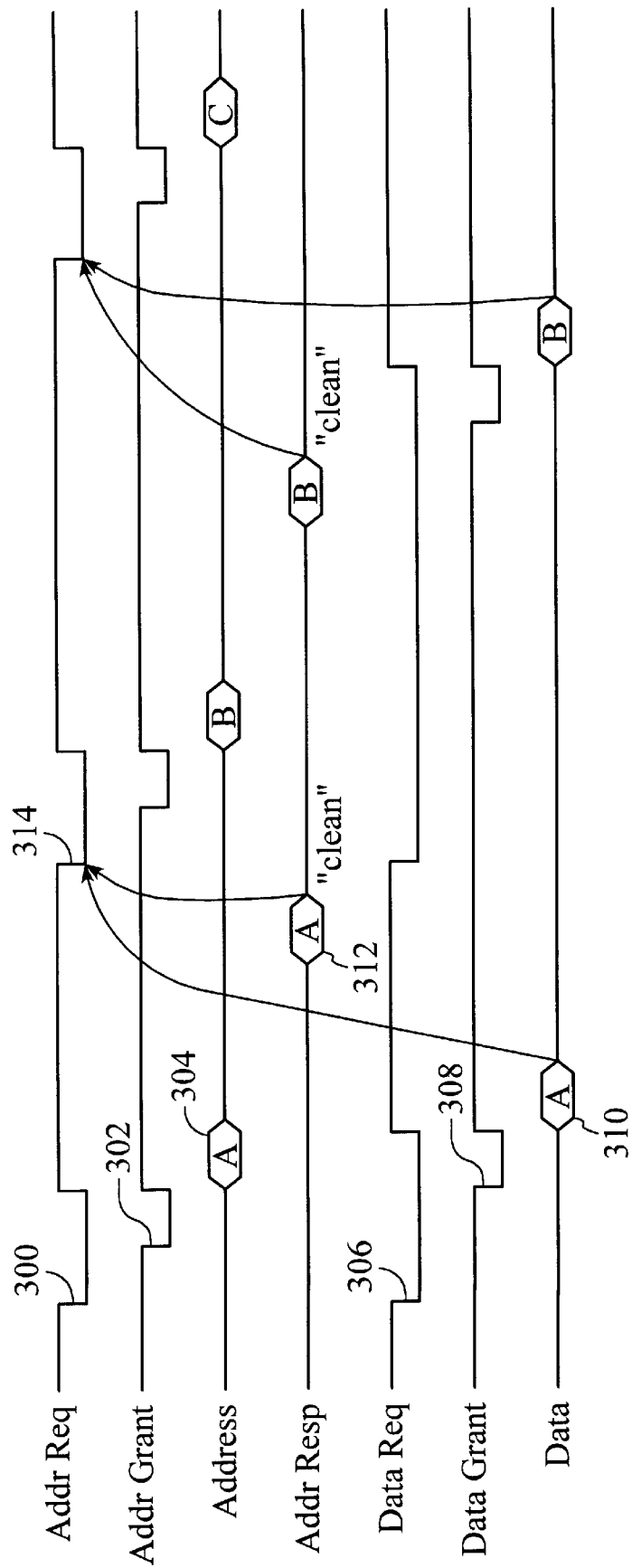
FIG. 3 is a timing diagram of the conventional method described in FIG. 2.

FIG. 3 is a timing diagram of the conventional method described in FIG. 2. A processor issues an address request as shown by signal 300. Sometime later, an address grant is received via signal 302. The address is then issued via signal 304. At a later time, an address response is received by the issuing processor. In this example, a "clean" response is received via signal 312.

A data request may be issued by the processor either at the same time as the address request or at a later time via signal 306. A data grant is later received via step 308, and the data is issued by the processor via signal 310. Only after the data 310 and a "clean" address response 312 has been received by the processor, the next address request can be issued via signal 314.

As previously mentioned, this delay directly translates into less than optimal performance. What is needed is a system and method for high speed transferring of ordered bus operations, such as cache-inhibited store instructions, in a processing system. The present invention addresses such a need.

Figure 4:
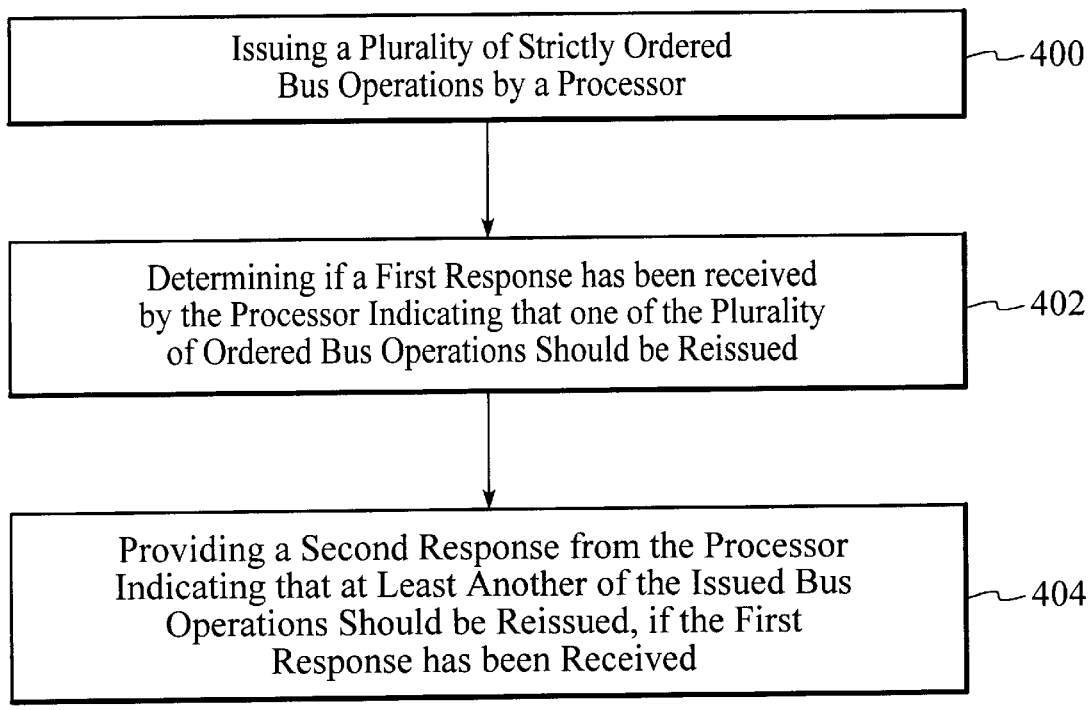
FIG. 4 is a flow diagram of a method according to the present invention for high speed transferring of ordered bus operations.

FIG. 4 is a flow diagram of a method according to the present invention. A plurality of bus operations, such as store requests, are issued by a processor 400. As previously mentioned, the bus operations are preferably strictly ordered, such as cache-inhibited store instructions. It is then determined if a first response has been received by the processor indicating that one of the plurality of the issued bus operations should be reissued via step 402. If the first response has been received, indicating that one of the issued bus operations should be reissued, then a second response is provided from the processor indicating that at least another of the issued bus operations should be reissued via step 404. This second response from the processor indicating that at least another of the issued bus operations should be reissued is herein referred to as a "self-retry" response. Preferably, the processor would provide a "self-retry" response for all of the bus operation requests issued after the bus operation request which received the initial "retry" response. The method according to the present invention is particularly useful for use with cache-inhibited store instructions.

Figure 5:
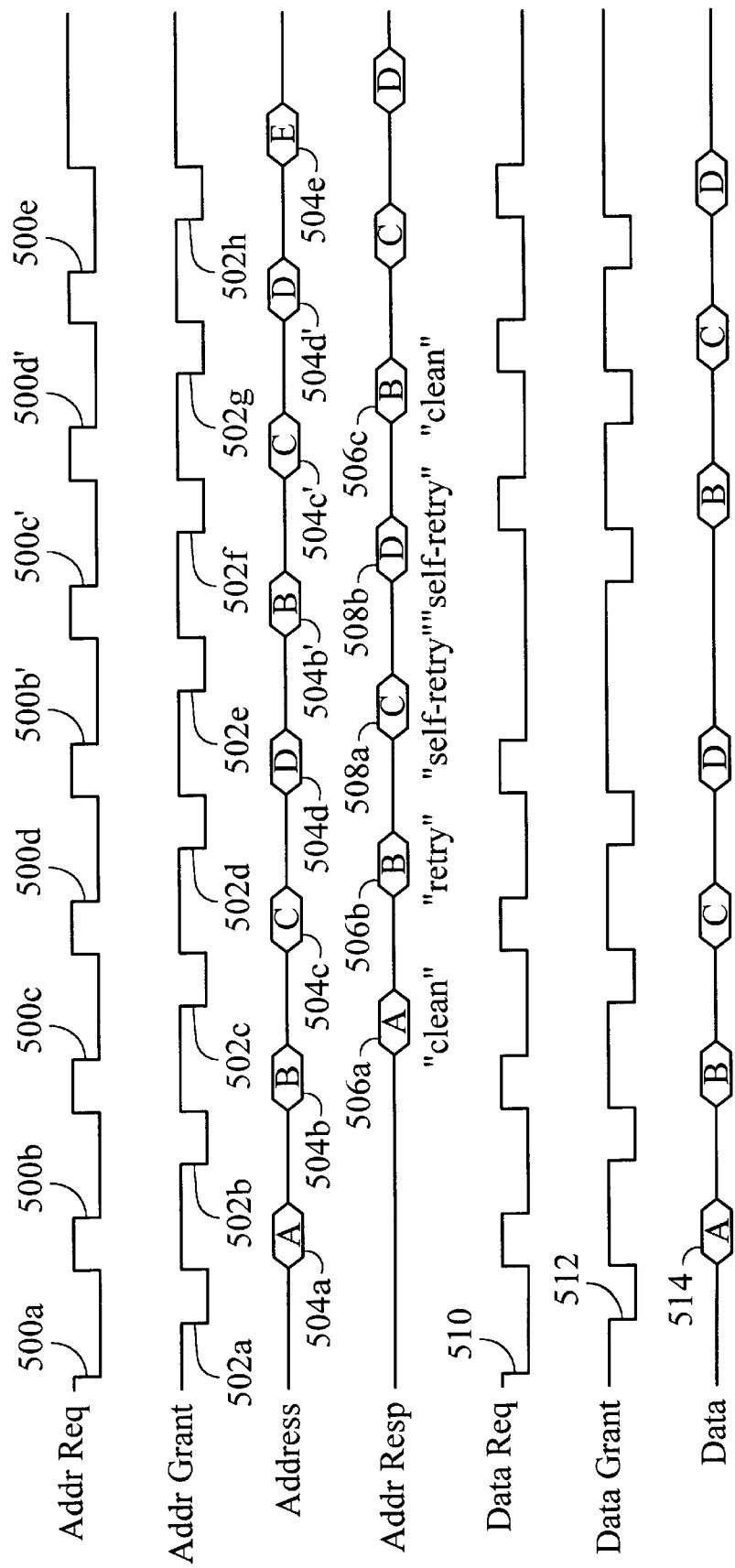
FIG. 5 is a timing diagram of the method according to the present invention.

FIG. 5 is a timing diagram of the method according to the present invention. A processor within the processing system continually issues address requests 500a–500b. It then receives address grants 500a–500b. Thereafter, the processor issues addresses 500a–500b.

In the example shown in the timing diagram of FIG. 5, an address response of "clean" 506a is received by the processor at approximately the same time as address request 500c is being issued. However, an address response of "retry" 506b is received as address request 500d is being issued. Once the "retry" response 506b has been received, then the next address request 500b' is again provided. Request 500b' is associated with the same address which received the initial "retry" response 506b. In other words, the same address is reissued by signal 504b'. Additionally, the issuing processor also provides a "self retry" response 508b for the other addresses which were issued prior to or approximately the same time as the initial "retry" response 506b which the issuing processor received. Note that the issuing processor itself supplies its own "self retry" response 508a.

After the issuing processor reissues the address 504b', it also reissues the other addresses which had been issued prior to or approximately the same time as receiving the initial "retry" response 506b. Hence, addresses 504c' and 504d' are reissued, preferably in the initial order in which it was issued.

Once a clean response 506c is received, the next address request 500e will be issued.

The data request 510 issues either at the same time as the address request 500 or sometime thereafter. The data grant 512 will be received after their corresponding request 510 are issued. Thereafter, data 514 can be issued.

Note that the ordering of the addresses and data are kept intact by the "self retry" responses 508a–508b. In contrast, the conventional method maintains ordering by not presenting a new address until both a "clean" response and a data transfer have occurred.

This system and method according to the present invention greatly improves ordered bus operation performance, such as cache-inhibited store performance, while still maintaining bus operation ordering. Pointers may be utilized to allow a bus interface unit to issue the operations such as store addresses and store data independently as fast as the bus protocol will allow. If a "retry" occurs, the pointers reset back to the retried store address and data entries and starts over. The BIU then "self-retries" any addresses that it issued after the first "retry" was received.

Figure 6:
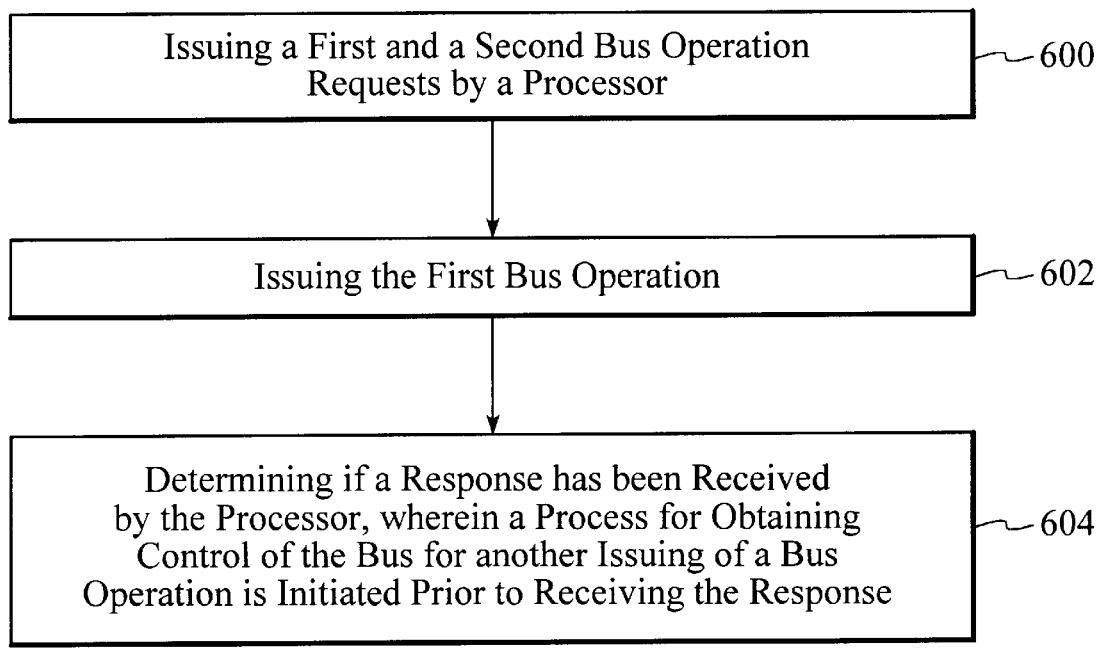
FIG. 6 is a flow diagram of a second embodiment of the present invention.

FIG. 6 is a flow diagram of a second embodiment of the present invention. The second embodiment is a system and method which works in conjunction with a type of bus, such as a 60X bus, which is configured to allow the bus master, such as a processor issuing bus operations, to keep control of the bus until it relinquishes it. Other types of buses, such as a 6xx bus, typically only allows a bus master to retain use of the bus for a limited time, such as one cycle.

According to the second embodiment, the bus master, for example the requesting processor, issues a request for the current address as well as a request for the next address in the queue to be issued. It then retains control of the bus until the processor receives a response. By the time the response is received, the request for the next address should already have been issued and the address grant has either been issued or is already in the process of issuing. In this manner, the system and method of the second embodiment improves bus operation transfer performance.

As shown in the flow diagram of FIG. 6, a first and a second bus operation requests are issued by a processor via step 600. The first bus operation is then issued via step 602. Then, it is determined if a response has been received by the processor, wherein a process for obtaining control of the bus for another issuing of a bus operation is initiated prior to receiving the response, via step 604.

Figure 7:
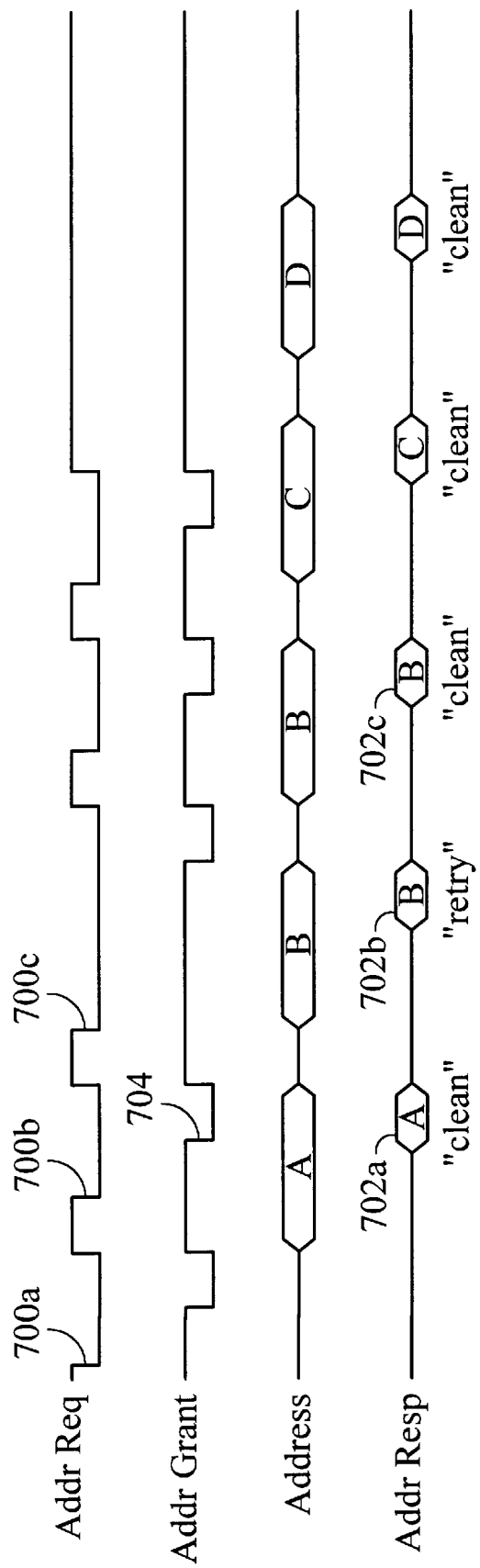
FIG. 7 is a timing diagram of the second embodiment of the present invention.

FIG. 7 is a timing diagram illustrating the second embodiment of the present invention. As shown by the timing diagram, two address requests are issued sequentially and the address grants are shown to be received sequentially. Address A is issued and the bus master, in this example, the issuing processor, retains control of the bus until it receives a response for address A, in this example, the response is a "clean" response.

Between the time the requesting processor issued the address request 700a for address A and the time a response 702a was received for address A, the next address request 700b had been issued. In this example, a provisional address grant 704 for the address request 700b had also been received by the time the response 702a had been received. Consequently, the requesting processor is able to quickly obtain control of the bus for address B.

By the time a response 702b for address B is received, another request 700c had been issued. Since the response for address B is "Retry," Address B is reissued and control of the bus is held until the next response 702c is received.

This process continues until the last address in the queue to be issued. In this example, the last address is addressed. After address request for address D is issued, no further requests are issued until either another address enters the queue to be issued, or address D receives a "retry" response.

Figure 8:
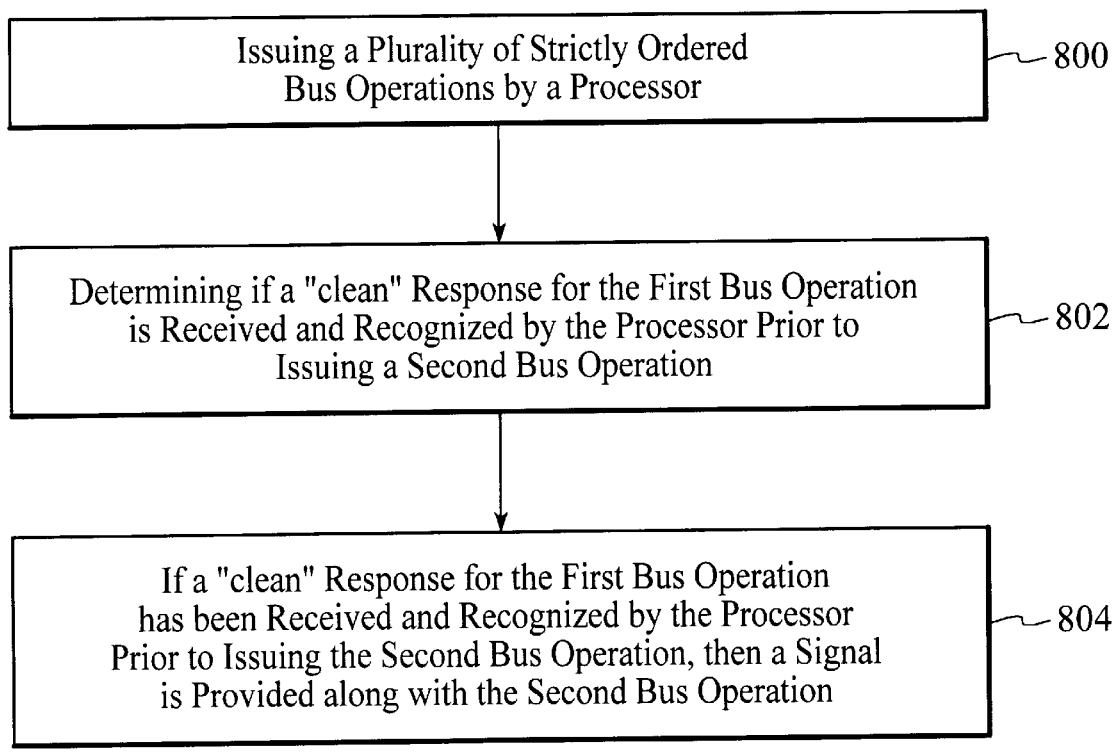
FIG. 8 is a flow diagram of a third embodiment of the present invention.

FIG. 8 is a flow diagram of a third embodiment of the present invention. This third embodiment works in conjunction with the first embodiment shown in FIGS. 4 and 5. After a requested address is issued, the memory controller 106 of FIG. 1 may send out the address, to the network for example, as soon as it is able. There is a chance, however, that the address will be "self-retried" by the issuing processor according to the first embodiment shown in FIGS. 4 and 5. If an address is "self-retried" after the memory controller has transferred it, then there may be problems with the ordering of the addresses.

The third embodiment of the present invention avoids this problem by attaching a signal along with selected address to indicate to the memory controller that the selected address will not be "self-retried". Thus, the memory controller is then free to transfer the selected bus operation as quickly as it can. Note that the memory controller remains free to send a "retry" response to the issuing processor with regard to the selected address. In this manner, ordered bus operations can be quickly transferred while still maintaining the strict ordering.

As shown in FIG. 8, a plurality of bus operations are issued by a bus master, a processor in this example, via step 800. As in the other embodiments, the bus operations are preferred to be strictly ordered. The plurality of ordered bus operations include a first and a second bus operation, wherein the second bus operation is issued next after the first bus operation is issued. It is then determined if a "clean" response for the first bus operation is received and recognized by the processor prior to issuing the second bus operation, via step 802. By the term "recognized", it is meant that the processor has enough time to note that it has received the "clean" response and is able to stop further issuance of additional address. If a "clean" response for the first bus operation has been received and recognized by the processor prior to issuing the second bus operation, then a signal is provided along with the second bus operation, via step 804. The signal indicates that the processor will not issue a "self-retry" for the second bus operation.

Figure 9:
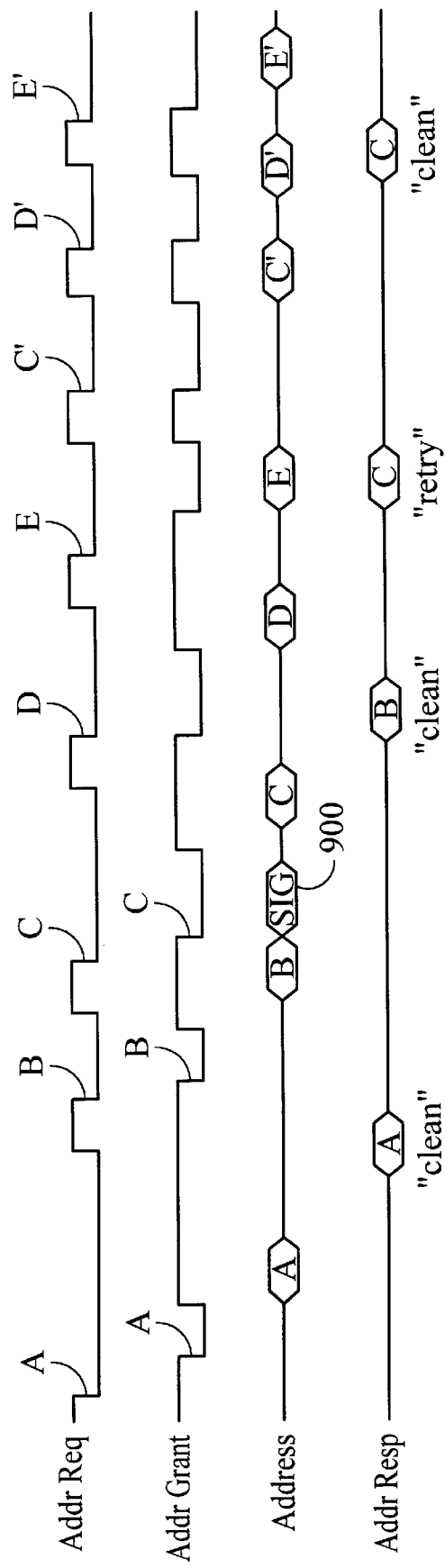
FIG. 9 is a timing diagram of the third embodiment of the present invention.

FIG. 9 shows a timing diagram of an example of the third embodiment shown on FIG. 8. An address request is issued and an address grant are issued for address A. An address response of "clean" is then received. After the "clean" response is received and recognized by the processor, an address request and address grant for address B is issued by the processor. A signal 900 can then be sent along with address B to indicate to the master controller that address B will not be "self-retried". The signal 900 is preferably only sent along with an address if a "clean" response has been received and recognized by the processor prior to issuing the next address. Thereafter, addresses C, D, and E are issued and reissued by the processor due to the "retry" response for address C. Note that addresses C, D, and E are not accompanied by a signal indicating that these addresses will not be "selfretried" since there has been no "clean" response received and recognized by the processor prior to issuing the next address. Thus, the signal indicating that a "selfretry" response will not be issued will preferably only accompany an address which is issued after enough time has elapsed to have received and recognized a "clean" response.

A system and method for a high speed transfer of ordered bus operations has been disclosed. Software written according to the present invention is to be stored in some form of computer-readable medium, such as memory or CD-ROM, or transmitted over a network and executed by a processor.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for transferring bus operations in a processing system which includes at least one processor, the method comprising the steps of:

(a) issuing a plurality of ordered bus operations by the at least one processor, wherein the plurality of bus operations include a first bus operation and a second bus operation, wherein the second bus operation is issued next after the first bus operation is issued;

(b) determining if a first response for the first bus operation has been received by the at least one processor prior to issuing the second bus operation, wherein the first response indicates that the first bus operation can be transferred; and (c) providing a signal along with the second bus operation if the first response for the first bus operation is received by the at least one processor prior to issuing the second bus operation, wherein the signal indicates that the processor will not issue a second response for the second bus operation, wherein the second response indicates that the second bus operation should be reissued.

2. The method of claim 1, wherein the plurality of bus operations are strictly ordered.

3. The method of claim 1, wherein the bus operations are store operations.

4. The method of claim 1, wherein the bus operations are cache-inhibited store operations.

5. A computer readable medium containing program instructions for transferring bus operations in a processing system which includes at least one processor, the program instructions comprising the steps of:

(a) issuing a plurality of ordered bus operations by the at least one processor, wherein the plurality of bus operations include a first bus operation and a second bus operation, wherein the second bus operation is issued next after the first bus operation is issued;

(b) determining if a first response for the first bus operation has been received by the at least one processor prior to issuing the second bus operation, wherein the first response indicates that the first bus operation can be transferred; and (c) providing a signal along with the second bus operation if the first response for the first bus operation is received by the at least one processor prior to issuing the second bus operation, wherein the signal indicates that the processor will not issue a second response for the second bus operation, wherein the second response indicates that the second bus operation should be reissued.

6. A system for transferring bus operations in a processing system which includes at least one processor, the system comprising:

means for issuing a plurality of ordered bus operations by the at least one processor, wherein the plurality of bus operations include a first bus operation and a second bus operation, wherein the second bus operation is issued next after the first bus operation is issued;

means for determining if a first response for the first bus operation has been received by the at least one processor prior to issuing the second bus operation, wherein the first response indicates that the first bus operation can be transferred, wherein the determining means is coupled to the issuing means; and means for providing a signal along with the second bus operation if the first response for the first bus operation is received by the at least one processor prior to issuing the second bus operation, wherein the signal indicates that the processor will not issue a second response for the second bus operation, wherein the second response indicates that the second bus operation should be reissued, wherein the providing means is coupled to the determining means.

7. A method for transferring bus operations in a processing system which includes at least one processor, the method comprising the steps of:

(a) issuing a plurality of ordered bus operations by the at least one processor, wherein the plurality of bus operations include a first bus operation and a second bus operation, wherein the second bus operation is issued next after the first bus operation is issued;

(b) determining if a first response has been received by the at least one processor indicating that one of the plurality of bus operations should be reissued;

(c) providing a second response from the at least one processor indicating that at least another of the issued bus operations should be reissued, if the first response has been received;

(d) determining if a third response for the first bus operation has been received by the at least one processor prior to issuing the second bus operation, the third response indicating that the first bus operation can be transferred; and (e) providing a signal along with the second bus operation if the first response for the first bus operation is received by the at least one processor prior to issuing the second bus operation, wherein the signal indicates that the at least one processor will not issue the second response for the second bus operation.

8. A computer readable medium containing program instruction for transferring bus operations in a processing system which includes at least one processor, the program instructions comprising the steps of:

(a) issuing a plurality of ordered bus operations by the at least one processor, wherein the plurality of bus operations include a first bus operation and a second bus operation, wherein the second bus operation is issued next after the first bus operation is issued;

(b) determining if a first response has been received by the at least one processor indicating that one of the plurality of bus operations should be reissued;

(c) providing a second response from the at least one processor indicating that at least another of the issued bus operations should be reissued, if the first response has been received;

(d) determining if a third response for the first bus operation has been received by the at least one processor prior to issuing the second bus operation, the third response indicating that the first bus operation can be transferred; and (e) providing a signal along with the second bus operation if the first response for the first bus operation is received by the at least one processor prior to issuing the second bus operation, wherein the signal indicates that the at least one processor will not issue the second response for the second bus operation.

* * * * *